Feb. 7, 1933.  C. G. MUNTERS  1,896,323
REFRIGERATION
Filed Jan. 20, 1928
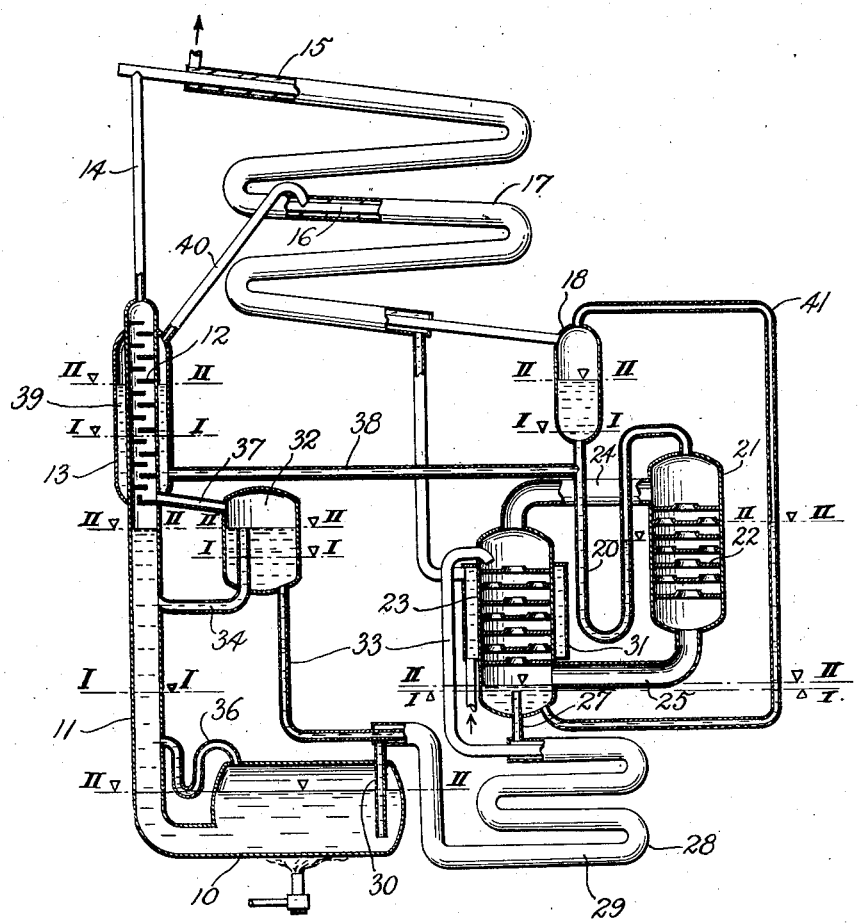
INVENTOR
Carl Georg Munters
BY
his ATTORNEY Patented Feb. 7, 1933

1,896,323

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

REFRIGERATION

Application filed January 20, 1928, Serial No. 248,244, and in Sweden January 20, 1927.

My invention relates to refrigeration and particularly to the circulation of fluid in absorption systems. Still more particularly my invention relates to absorption systems of the type wherein an equalizing medium such as a gas inert with respect to evaporated cooling agent is used to equalize pressure though it is not limited to such type.

The principal object of my invention is to provide an improved periodic liquid circulation in an absorption refrigerating system. In the preferred form of the invention I utilize a reduction of pressure in a condenser assisted by generation of vapor in a generator or expeller to cause the circulation. In the preferred form, liquid is periodically withdrawn from the expeller to form a liquid column for causing liquid to flow to the absorber. A liquid seal is formed between the vapor space of the expeller and the liquid column. This liquid seal is broken due to lowering of the surface of the liquid in the expeller to a predetermined level which is preferably determined by the position of a bend of the liquid seal.

The preferred apparatus is of continuous operation with periodic isolation of the condenser to cause the decrease in pressure. A liquid closure or seal between the condenser and generator is used in the specific embodiment hereinafter described to periodically diminish or stop flow of vapor from the generator to the condenser.

On the accompanying drawing which shows more or less diagrammatically one form of the invention:

Reference character 10 designates the generator or expeller which contains a cooling agent or refrigerant, which is to be condensed and evaporated, in solution in absorption liquid. While various cooling agents may be used and various liquids may be used for absorption liquid, I will designate ammonia as the cooling agent and distilled water as the absorption liquid. Connected to the lower part of the generator is a riser conduit 11. The upper part of riser conduit 11 contains a series of baffles 12 which form part of a rectifier indicated generally by reference character 13. Connected to the top of the rectifier is a vapor conduit 14 which serves to carry vapor driven from the solution in the generator to the condenser 15 where it is condensed for subsequent evaporation. The condenser consists of a downwardly inclined vapor and liquid conveying conduit 16 surrounded by suitable cooling means such as the water conduit 17. Any kind of cooling medium may be used. The lower end of the condenser 15 is connected to a receptacle 18. Receptacle 18 is connected at the bottom to a U-tube 20 which has a considerable downward extent as it leads from the receptacle 18 and which extends upwardly to a point such that it is adapted to discharge liquid cooling agent into evaporator 21. Evaporator 21 contains disks 22 which may be of the type shown in Patent No. 1,609,334 of December 7, 1926. Evaporator 21 is connected to absorber 23 which also contains disks which may be of the type shown in the same patent. The absorber and evaporator are connected by an upper gas conduit 24 and a lower gas conduit 25. These conduits may be in heat exchange relation and the circulation through the same is as described in the patent above referred to. The absorber-evaporator cycle includes an auxiliary agent into which the cooling agent diffuses. I prefer hydrogen for use with ammonia and water. Circulation is caused downwardly through the evaporator and upwardly through the absorber due to difference in specific weight of a mixture of hydrogen and ammonia vapor on the one hand and hydrogen alone on the other hand. While this is the preferred arrangement of evaporator and absorber and means for conveying fluid from the one to the other, it will be readily understood that the present invention is not limited to this specific arrangement but that many other arrangements may be used to make up an evaporator-absorber cycle and it is not even necessary that this part of the apparatus be a true circulatory cycle though I prefer such.

In the absorber the hydrogen is liberated and the evaporated ammonia is absorbed into solution and collects in the bottom part of the absorber from which it passes through conduit 27 to the outer pipe 28 of the absorption liquid heat exchanger designated generally by reference character 29. Outer pipe 28 is connected by means of conduit 30 with the liquid space of the generator. The absorber is cooled by a cooling jacket 31 which is connected in series with the cooling water pipe 17 of the condenser.

A receiver or separator 32 is connected at such a level that liquid may flow by gravity from the same through conduit 33 and into the top of absorber 23. Conduit 33 is the inner pipe of the heat exchanger 29 and liquid flowing through the same toward the absorber is cooled by liquid passing through pipe 28 toward the generator. Pipe 34 connects riser conduit 11 with separator 32. Conduit 34 extends within separator 32 so that it is on a certain height above the opening of conduit 33 in the absorber. Receiver 32 is connected at the top to riser conduit 11 by a gas line 37. Connected to the top of the generator and connected with riser conduit 11 is a conduit or tube 36 which has a downward and upward bend like the letter U and which is adapted to act as a seal as will hereinafter be explained. It will be seen that conduit 36 is connected to the generator at a level higher than that at which riser conduit 11 is connected to the generator. Furthermore, conduit 36, as shown, is connected to riser conduit 11 at a level higher than that at which conduit 36 communicates with the generator.

Conduit 20 is connected by means of conduit 38 with a chamber 39 surrounding the upper part of riser conduit 11 and forming part of the rectifier. Chamber 39 is connected to the gas space of the condenser by means of conduit 40. The level of liquid in receptacle 18 and chamber 39 is maintained the same by means of conduits 38 and 40. A conduit 41 connects the upper part of receptacle 18 with the lower part of the absorber for carrying away from the receptacle 18 traces of hydrogen which may have been carried over to receptacle 18 from the generator and through the condenser.

The operation of the apparatus is as follows:

Assume for the moment that the liquid in the various vessels of the system is at the levels indicated by dash and dot lines I—I. There is now pressure equalization throughout the apparatus. Generator 10 is filled to the top with water containing ammonia in solution and conduit 36 is also filled with liquid. The liquid level in chamber 39 and receptacle 18 is determined by the height of the right hand leg (as shown in the drawing) of U-conduit 20. Were the liquid higher, it would overflow through the right hand leg of conduit 20 into the evaporator. The liquid level in receiver 32 is determined by the highest point of conduit 33 in the right hand part (as shown) which discharges into the absorbers. The assumption is that this is a step in the operation and so there is some vapor in the condenser. Were this the initial operation, some vapor of the cooling agent would collect in the condenser which would pass off of the surface of the absorption liquid. The condenser is now isolated from the generator, absorber and evaporator. Liquid in conduit 20, that is in the U-seal between the condenser and evaporator, causes the isolation as between the condenser and evaporator. Liquid in conduits 41 and 33 causes isolation between the condenser and the absorber. The liquid in conduits 36 and 11 causes isolation between the generator and the condenser. The cooling water or other cooling medium being supplied at this time, there is a condensation. This causes a decrease in volume of gas in the condenser and the diminution of volume causes a diminution of pressure so that there is, in effect, a suction action in the condenser, the pressure of the condenser being lower than that of the absorber and evaporator, and the decreased pressure in the condenser serves to suck or draw liquid upwardly in riser conduit 11, upwardly through the part of conduit 33 which is connected to receiver 32, upwardly in the right hand portion (as shown) of conduit 41 and upwardly in the left hand portion (as shown) of conduit 20. The levels are now those or approaching those indicated by dash and dot lines II—II. The vapor of the cooling agent expelled in the generator due to continued heating does not pass through conduit 36 but remains in the upper part of the generator and forces down the level of liquid in the generator and in the right hand leg (as shown) of the U-shape conduit 36. The weak liquid which is now being elevated or on which there is a suction effect in riser conduit 11, flows in part through conduit 34 and into the receiver 32.

The accumulation of vapor of the cooling agent in the upper part of the generator and the consequent lowering of the liquid level in the generator serves to aid the suction effect produced by the variation of condensation. The suction period continues until the level of liquid in the generator is lowered to a point where the level of liquid in U-shaped conduit 36 has reached the lower bend, that is, as indicated by the dash and dot lines II—II drawn across the generator. Vapor accumulated in the generator is now able to pass through conduit 36, which may be termed a flow control conduit, and through liquid in riser conduit 11 and from thence past rectifying disks 12 and to the condenser. This causes an equalization of pressure and the liquid in the cooperating branches of the various seals or U-shaped conduit portions equalizes so that the levels are returned to the positions indicated by dash and dot lines I—I, the liquid which has been introduced into receiver 32 during the suction period now flowing through conduit 33 to the absorber. The accumulated vapor in the generator passes to the condenser during this period of equalization and condensed cooling agent passes into the evaporator from condut 20.

The evaporation and absorption takes place in more or less continued and constant rate as the disks 22 in the evaporator hold ammonia and the disks in the absorber hold absorption liquid. When ammonia passes through the rectifier 13 it is cooled by condensed ammonia in chamber 39 in manner described in my copending application Serial No. 132,160 filed August 28, 1926, Patent No. 1,808,723, granted June 2, 1931, the vapor of ammonia generated in chamber 39 being conducted through condut 40 to the condenser to be recondensed.

Obviously other types of absorption refrigerating systems may use the principle of operation constituting the main feature of this invention. Obvious changes are, for example, sucking strong liquid from the absorber to a receiver placed at a high level relative to the generator and causing the strong liquid to run into the generator from such receiver and connecting conduit 34 directly with the lower part of the generator instead of conduit 11.

Having thus described my invention, what I claim is:

1. Refrigerating apparatus comprising a generator, a condenser, an upwardly extending riser conduit communicating with the generator and extending above the generator and connected at its upper end to the condenser, an absorber, an evaporator, a liquid seal connected between the condenser and the evaporator and arranged to permit a lower pressure to exist in the condenser than in the evaporator and absorber, and means for circulation of absorption liquid between the generator and absorber including a receiver arranged at a high level with respect to the absorber and adapted to receive liquid from the riser conduit and a flow control conduit connecting the generator with the riser conduit.

2. Refrigerating apparatus comprising a generator, a condenser, an upwardly extending riser conduit connected at its lower end to the lower part of the generator and connected at its upper end to the condenser, an absorber, an evaporator, a liquid seal connected between the condenser and the evaporator, means for circulation of absorption liquid between the generator and absorber including a receiver arranged to permit flow of liquid therefrom into the absorber and a tube for forming a liquid seal connecting the upper part of the generator with the riser conduit.

3. Refrigerating apparatus comprising a generator, a condenser, an upwardly extending riser conduit connected to the lower part of the generator and connected at its upper end to the condenser, means to cool the condenser, a receiver situated above the generator, a conduit connecting said riser conduit with said receiver, a conduit connecting the upper part of said generator with the riser conduit arranged to form a liquid seal, an absorber, a conduit connecting said receiver with said absorber, a conduit connecting said absorber with said generator, an evaporator, open connections for circulating a gas between and through the absorber and evaporator and means to conduct liquid from the condenser to the evaporator and interpose liquid between the evaporator and the condenser to permit a lower pressure to exist in the condenser than in the evaporator and absorber.

4. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member having an intermediate portion below said second level.

5. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member being constructed to cause fluid to flow in a path having an intermediate point below said second level.

6. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member causing fluid passing from the expeller therethrough to flow downwardly below said second level and thence upwardly to the riser conduit.

7. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member being constructed to cause fluid passing from the expeller therethrough to pass upwardly above said second level, thence downwardly below said second level and thence upwardly to the riser conduit at said third level.

8. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member consisting of a narrow pipe having an intermediate U-bend extending below said second level.

9. In refrigerating apparatus, an absorber, an expeller and means for producing flow of liquid therebetween including a riser conduit communicating with the expeller at a first level and extending upwardly above the expeller, and a tubular flow control member communicating with the expeller at a second level higher than said first level and communicating with said riser conduit at a third level above said second level and said tubular member comprising a narrow pipe having an intermediate portion below said second level and said riser conduit consisting of a relatively wide pipe.

10. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member having a portion below said second level.

11. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member being constructed to cause fluid to flow in a path having an intermediate point below said second level.

12. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member causing fluid passing therethrough from the heated vessel to flow downwardly below said second level and thence upwardly to the riser conduit.

13. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member being constructed to cause fluid passing therethrough from the heated vessel to pass upwardly above said second level, thence downwardly below said second level and thence upwardly to the riser conduit.

14. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member consisting of a narrow pipe having an intermediate U-bend extending below said second level.

15. In refrigerating apparatus, a heated vessel, a cooled vessel and means for producing flow of liquid therebetween in periodic cycles including a riser conduit communicating with the heated vessel at a first level and extending upwardly above the heated vessel, and a cycle control conduit member communicating with the heated vessel at a second level higher than said first level and communicating with said riser conduit and said cycle control member comprising a narrow pipe having an intermediate portion below said second level and said riser conduit consisting of a relatively wide pipe.

16. Refrigerating apparatus comprising a heated vessel, a condenser, an upwardly extending riser conduit communicating with said heated vessel at a first level and communicating at a relatively high elevation with the condenser, an absorber, an evaporator, a liquid seal connected between the condenser and the evaporator, means for circulation of absorption liquid between the heated vessel and said absorber including a receiver arranged to permit flow of liquid therefrom into the absorber and a tube for forming a liquid seal connecting the heated vessel with the riser conduit and communicating with the heated vessel at a level higher than said first level.

17. That improvement in the art of refrigerating through the agency of an absorption system including an expeller, a condenser, an evaporator and an absorber which consists in causing periodic flow of liquid between the expeller and the absorber by periodically withdrawing liquid upwardly from the expeller due to heating the expeller and cooling the condenser to form a liquid column for causing liquid to flow to the absorber, forming a liquid seal between the vapor space of the expeller at a higher level than that of withdrawal of liquid and the liquid column and breaking the seal due to lowering of the surface of liquid in the expeller to a predetermined level.

18. That improvement in the art of refrigerating through the agency of an absorption system including an expeller and an absorber which consists in causing periodic flow of liquid between the expeller and the absorber by periodically withdrawing liquid upwardly from a given level in the expeller to form a liquid column for causing liquid to flow to the absorber, forming a liquid seal between the vapor space of the expeller at a level higher than said given level and the liquid column and breaking the seal due to lowering of the surface of the liquid in the expeller to a predetermined level.

19. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member having an intermediate portion below said second level.

20. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member being constructed to cause fluid to flow in a path having an intermediate point below said second level.

21. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member causing fluid passing from the generator therethrough to flow downwardly below said second level and thence upwardly to the riser conduit.

22. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member being constructed to cause fluid passing from the generator therethrough to pass upwardly above said second level, thence downwardly below said second level and and thence upwardly to the riser conduit at said third level.

23. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member consisting of a narrow pipe having an intermediate U-bend extending below said second level.

24. Refrigerating apparatus of the absorption type having a refrigerant circuit including a generator, a condenser, an evaporator and an absorber, connections forming a circuit for circulation of an inert gas between and through the evaporator and absorber, and connections forming a circuit for flow of absorption liquid between the generator and absorber including a riser conduit communicating with the generator at a first level and extending upwardly above the generator, and a tubular flow control member communicating with the generator at a second level higher than said first level and communicating with said riser conduit at a third level above said second level and said tubular member comprising a narrow pipe having an intermediate portion below said second level and said riser conduit consisting of a relatively wide pipe.

In testimony whereof I hereunto affix my signature.

CARL GEORG MUNTERS.